(12) United States Patent
Johansson

(10) Patent No.: US 7,592,546 B2
(45) Date of Patent: Sep. 22, 2009

(54) CABLE DUCT FOR A VEHICLE

(75) Inventor: Robert Johansson, Mölndal (SE)

(73) Assignee: Volvo Lastvagnar AB, Gothenburg (DE)

( * ) Notice: Subject to any disclaimer, the term of this patent is extended or adjusted under 35 U.S.C. 154(b) by 0 days.

(21) Appl. No.: 10/908,281

(22) Filed: May 5, 2005

(65) Prior Publication Data

US 2006/0144612 A1     Jul. 6, 2006

Related U.S. Application Data

(63) Continuation of application No. PCT/SE03/01303, filed on Aug. 22, 2003.

(30) Foreign Application Priority Data

Nov. 5, 2002     (SE) .................................... 0203249

(51) Int. Cl.
*H02G 3/04* (2006.01)
(52) U.S. Cl. .................. 174/95; 174/68.1; 174/97; 439/207
(58) Field of Classification Search .................. 174/95, 174/72 A, 71 R, 68.1, 68.3, 97; 439/207
See application file for complete search history.

(56) References Cited

U.S. PATENT DOCUMENTS

| | | | | |
|---|---|---|---|---|
| 3,014,139 A | * | 12/1961 | Shildneck | 310/64 |
| 3,098,892 A | * | 7/1963 | Spade et al. | 174/47 |
| 4,768,442 A | * | 9/1988 | Miller | 104/106 |
| 5,301,421 A | | 4/1994 | Strefling | |
| 5,670,860 A | | 9/1997 | Conrady et al. | |
| 5,685,361 A | | 11/1997 | Demmler et al. | |
| 5,703,330 A | * | 12/1997 | Kujawski | 174/72 A |
| 5,909,099 A | | 6/1999 | Watanabe et al. | |
| 6,220,955 B1 | | 4/2001 | Posa | |
| 6,367,211 B1 | * | 4/2002 | Weener et al. | 52/220.1 |
| 6,417,452 B1 | * | 7/2002 | Doshita | 174/72 A |
| 2002/0017390 A1 | | 2/2002 | Gregor et al. | |

FOREIGN PATENT DOCUMENTS

| | | |
|---|---|---|
| DE | 19605994 C1 | 4/1997 |
| DE | 10012950 A1 | 9/2001 |
| EP | 0408476 A2 | 1/1991 |
| EP | 0823766 A1 | 2/1998 |
| EP | 1026703 A2 | 8/2000 |
| FR | 2715773 A1 | 8/1995 |

* cited by examiner

*Primary Examiner*—Dhiru R Patel
(74) *Attorney, Agent, or Firm*—Novak Druce + Quigg, LLP

(57) ABSTRACT

Method and arrangement for providing a cooled cable duct which is intended for fitting in hot environments in vehicles and in which cabling can be laid to protect it against heat. The cable duct (1) includes a plurality of longitudinal sections (2, 3) in which a first section (2) is intended to support one or more cabling(s) and in which a second section (3) is intended for connection to an external cooling system so that a cooling medium can pass through the at least one said second section (3).

13 Claims, 2 Drawing Sheets

CABLE DUCT FOR A VEHICLE

CROSS-REFERENCE TO RELATED APPLICATIONS

The present application is a continuation patent application of International Application No. PCT/SE2003/001303 filed 22 Aug. 2003 which was published in English pursuant to Article 21(2) of the Patent Cooperation Treaty, and which claims priority to Swedish Application No. 0203249-8 filed 5 Nov. 2002. Said applications are expressly incorporated herein by reference in their entireties.

TECHNICAL FIELD

The present invention relates to a cooled cable duct for a vehicle and a method for installing cabling on a vehicle.

BACKGROUND OF THE INVENTION

Modern vehicles are subject to ever increasing demands in terms of comfort, fuel consumption and emission requirements. In order to be able to meet these demands, the vehicles are equipped with more and more electronic components. These components have to be connected to various control units by some form of cabling, which is normally unlikely to cause any major problems. Problems do arise, however, when a component is to be fitted on or close to the engine or when the cabling has to be run on or close to the engine. It becomes especially difficult when a component is fitted on the hot side of the engine. On an in-line engine, the hot side is the side on which the manifold is fitted.

When a component is to be fitted on the hot side of the engine, then it has to be designed such that it withstands the high temperature generated by the engine. This can be achieved by choice of material, shielding and/or cooling. The cabling connecting the component to the electrical system of the vehicle also has to be dimensioned to withstand the high temperature.

Traditionally, cabling made of a variety of heat-resistant materials has been used to cope with high temperature requirements, for example teflon or silicone cabling. The drawback with these cablings is that they are expensive, apart from which the materials are difficult to work, which adds to the cost of connecting the cabling both to the component and to the connector. Certain temperature-resistant materials are, moreover, toxic, which makes them harder to handle.

U.S. Pat. Nos. 5,301,421, 5,670,860, EP 1026703 and EP 0408476 describe cabling having integrated cooling ducts for cooling away power dissipations in the cabling. Common to these documents is the fact that one or more hoses or pipes are combined with one or more electrical conductors to form an electric cabling. A cooling medium can then be conducted through the hose/pipe in order to cool the cabling. The aim of these proposals is to cool high-duty cabling so that the cabling does not intrinsically overheat. These proposals require both special production and special connectors, which becomes extremely costly. Moreover, the cabling in hot environments is not thereby protected, since the cooling is integrated in the cabling. The outer sheath of the cabling is therefore unprotected against heat radiation.

U.S. Pat. No. 5,909,099 and EP 0823766 describe cabling used for electric cars, in which the battery pack is charged inductively. To prevent the inductance coil from becoming overheated, it is cooled via cooling ducts integrated in the cabling. In these documents, too, one or more hoses are combined with one or more electrical conductors to form a cabling. A cooling medium can then be conducted through the hose in order to cool the inductance coil. These proposals, too, require both special production and special connectors, which becomes extremely costly. Moreover, the cabling in hot environments is not thereby protected, since the cooling is integrated in the cabling. The outer sheath of the cabling is therefore unprotected against heat radiation.

US 2002017390 A1 describes a cable with cooling in the outer sheath intended for laying in hot pipes, for example district heating pipes. This proposal, too, requires special production and special connectors, which becomes extremely costly.

DE 10012950 A1 describes an air-cooled cable system in vehicles, in which one or more cables is/are disposed in a corrugated hose or in a corrugated hose system.

The cables are held centered in the hose by a number of distancing elements. Cooling air is blown into the hose system by means of a cooling fan. This cable system, too, requires a special production, which becomes expensive and unwieldy.

Finally, U.S. Pat. No. 6,220,955 describes a cabling in which cooling ducts and electrical conductors have been combined to allow the transmission of both electric power and cooling function in a common cabling. This document, too, describes the transmission of a cooling medium to a component, not a means of protecting a cabling from heat and heat radiation.

SUMMARY OF THE INVENTION

One object of the invention is to achieve a cable duct which enables a conventional cabling to be used in hot environments and a method which allows a conventional cabling to be installed in hot environments.

Regarding a cable duct for a motor vehicle, a plurality of longitudinal sections (2,3) are included in which a first section (2) is intended to support one or more cabling(s), and the benefit of the invention is achieved by a second section (3) that is intended for connection to an external cooling system so that a cooling medium can pass through the at least one second section (3).

The method of the invention achieves these objects by fitting a cable duct on the vehicle, connecting the cable duct to a cooling system and installing the cabling in the cable duct.

This first configuration of the cable duct according to the invention produces a cable duct for a vehicle which comprises a cooling duct. The advantage with this is that the cable duct allows a conventional cabling to be installed in environments in which the temperature would normally be too high for the cabling. Moreover, the cable duct according to the invention can conduct a cooling medium to a component which requires cooling.

In an advantageous first refinement of the cable duct according to the invention, the cable duct comprises some form of fastening device for the cabling. The advantage with this is that the cabling is fixed to the cable duct.

In an advantageous second refinement of the cable duct according to the invention, the cable duct comprises a plurality of cooling ducts. The advantage with this is that the cooling medium can be conducted bi-directionally (both to and fro) through the cable duct.

In an advantageous third refinement of the cable duct according to the invention, the cable duct comprises a connecting device for connecting the cooling duct directly to another component. The aim of this is to make the cable duct easier to fit.

In an advantageous fourth refinement of the cable duct according to the invention, the cable duct comprises a cover which can cover at least a part of the opening in the cable duct. The aim of this is to be able to protect cabling installed in the cable duct from heat radiation from a number of directions.

In an advantageous fifth refinement of the cable duct according to the invention, the first section is realized as a closed duct. The aim of this is to be able to protect cabling installed in the cable duct from both heat radiation and mechanical wear.

A method according to the invention for installing a cabling in a hot environment on a vehicle comprises the steps of fitting a cable duct on the vehicle, connecting the cable duct to a cooling system and installing the cabling in the cable duct. The advantage with this method is that it is possible to use conventional cabling in hot vehicle environments in which it was previously necessary to use some type of special cabling.

BRIEF DESCRIPTION OF THE DRAWINGS

The invention will be described in greater detail below, with reference to illustrative embodiments shown in the accompanying drawings, in which.

DETAILED DESCRIPTION

Figure 1:
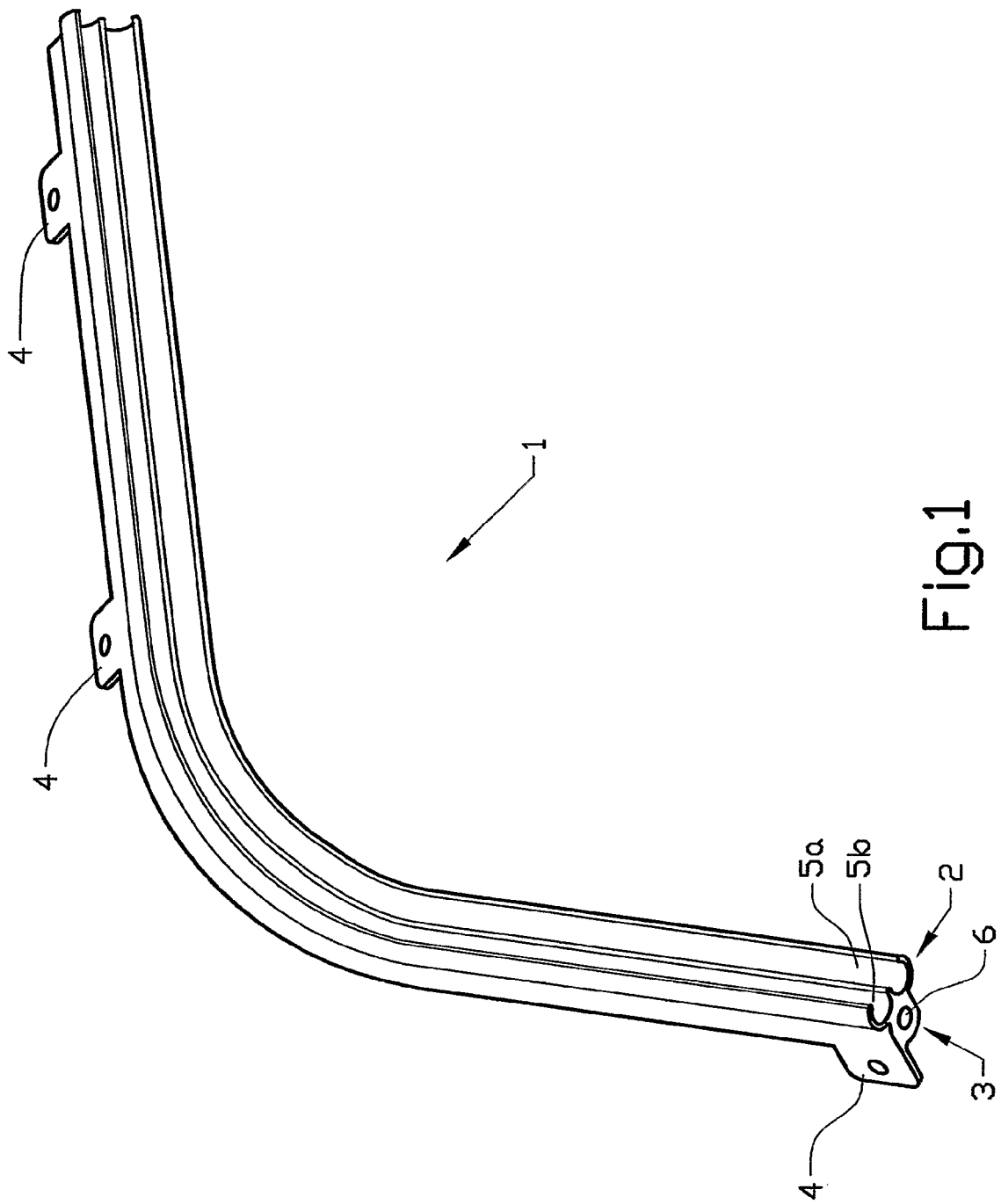
FIG. 1 is a perspective view showing a cable duct configured according to the present invention.

The following described illustrative embodiments of the invention, with refinements, should be regarded only as examples and should in no way limit the scope of protection of the patent claims. In the illustrative embodiments that are described here, the same reference numerals refer in the various figures to the same type of component part. Not all component parts therefore receive a detailed description in all illustrative embodiments.

FIG. 1 shows a cable duct 1 that is configured according to the invention and that comprises (includes, but is not necessarily limited to) a plurality of longitudinal sections 2,3. Section 2 is intended to conduct one or more cabling(s) and section 3 is intended to conduct a cooling medium. In the first illustrative embodiment that is described, the cable duct is designed to conduct the cabling which links a component fitted in a hot position on the engine, for example an electrically controlled EGR valve (EGR=Exhaust Gas Recirculation) to a control unit. The EGR valve is fitted directly connected to the manifold of the engine, which is one of the hottest positions on the engine. In order to withstand the high temperature, the EGR valve is cooled with cooling water from the cooling system. The cable duct has a longitudinal spread; i.e., the length of the cable duct is greater than any of the cross-sectional dimensions of the cable duct.

Figure 2A:
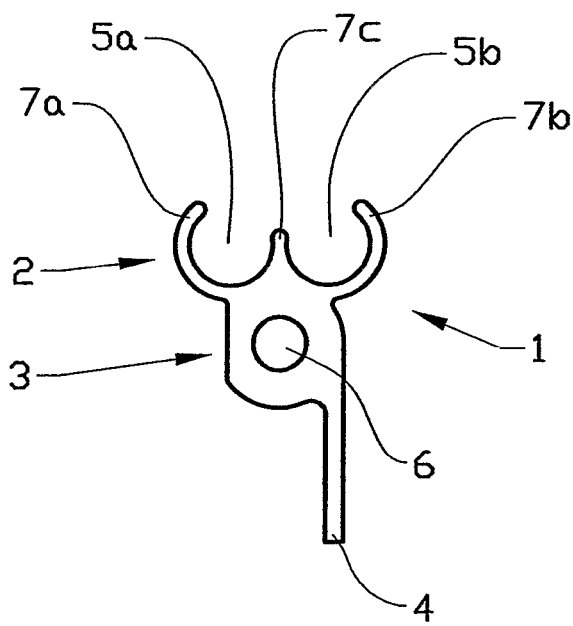
FIGS. 2a-2d are cross-sectional views showing examples of various cross-sectional configurations of a cable duct configured according to the teachings of the present invention.

In order for the cabling, too, to be able to cope with the high temperature, the cable duct 1 is realized with a cooling duct 6 for a cooling medium. The cooling duct 6 is connected to a cooling system in an appropriate manner, for example with a screw-fitted sleeve coupling and a rubber hose. The cable duct 1 can, for example, be realized as an extruded aluminum profile, which is bent such that it fittingly follows the outer contour of the engine. In addition, it is also possible to produce the cable duct differently, for example as a die-cast part made of a heat-conducting and heat-resistant material, for example an aluminum alloy or a composite. The aluminum profile can have a cross section, for example, according to FIG. 2a. In this example, the cable duct comprises two ducts 5a, 5b intended for cabling and a cooling duct 6 for a cooling medium, for example cooling water. The ducts 5a, 5b have two outer side walls 7a, 7b and an inner, common partition wall 7c.

The cabling in this example consists of electric cables lying in a flexible, corrugated plastic tubing. The ducts 5a, 5b are configured so that the plastic tubing fits into the ducts with a certain press fit so that the cabling, once installed, is held in place. The outer walls can be formed, for example, so that the distance between an outer wall and a partition wall in the open part of the duct is somewhat smaller than the cabling to be installed. In this case, where the cabling is round, the distance between the outer wall and the partition wall in the open part of the duct is made less than the diameter of the cabling. This ensures that the cabling is held in place once it is installed. Where the cabling is asymmetrical, the distance between the outer wall and the partition wall in the open part of the duct is preferably less than the smallest dimension of the cabling so that the cabling is held securely in place.

The cable duct 1 is also provided with fastening devices 4 are appropriately configured for fitting the cable duct on, for example, an engine. Exemplarily, the fastening devices can consist of holed projections which have been machined out of the extruded profile. The cable duct is screw-fastened in the engine, for example, with bolts. It can also be advantageous to provide the cable duct with fastening devices for other components. For example, the cable duct can then be provided with some form of projection in which another component can be fixed, such as, for example, a return line for cooling water.

The cooling duct 6 can be connected to the vehicle cooling system in a number of ways. It is important for the connection to be pressure-tight so that it copes with the high pressures which can occur in a cooling system. For example, a screw-fitted coupling sleeve can then be used, to which a cooling hose is connected. It is possible to use the cooling duct not only to cool the cabling, but also to feed cooling water to a component which is to be cooled, for example an EGR valve. In this case, the cooling water is conducted to the component through the cable duct. After the component, the cooling water is then returned to the cooling system through a separate line. This is most especially advantageous where the component has a high cooling requirement; i.e., where the cooling water is heated considerably in the component.

In this example, the ordinary vehicle cooling system is used to cool the cable duct; i.e., the cooling medium is water with mixed-in antifreeze agent, for example glycol. Of course, it is not essential to use water as the cooling medium, but rather oil or air, for example, can be used where this is suitable and/or where the cooling requirement of the cable duct and/or of a connected component can be satisfied. One advantage of using air as the cooling medium is, for example, that there is no need for a return line for the spent air, but rather it can be discharged after having passed the cable duct and any connected component.

Figure 2B:
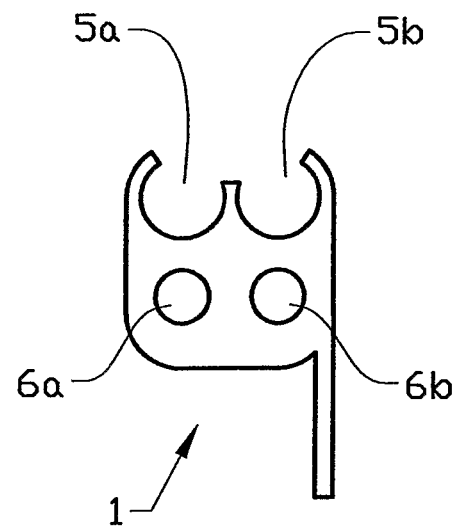

In a second preferred embodiment, the cable duct 1 is provided with two cooling ducts 6a, 6b according to FIG. 2b. In this case, the one cooling duct 6a is the supply line for the cooling water and the other cooling duct 6b is the return line. The supply line and the return line can be connected together at one end of the cable duct. The advantage with this realization is that the cooling ducts only connect to the cooling system on one side of the cable duct, making the cable duct easier to fit. It is also possible to use the supply line to feed cooling water to a component which is to be cooled, for example, an EGR valve. In this case, the return line is used to return cooling water from the component to the cooling system. This is, above all, advantageous where the component has a low cooling requirement; i.e., where the cooling water is not heated especially much. In this case, the supply and return conduits have approximately the same temperature which means that they can be run side-by-side without affecting each other in terms of temperature. It is also, of course, possible to integrate a plurality of supply and return conduits in the cable duct should this be desirable, for example where two components are to be cooled.

In a third preferred embodiment of the cable duct 1, the cooling duct(s) is/are connected to the cooling system at the same time as the cable duct is fitted. This is done by some form of press connection, in which the cable duct(s) connection is pressed against the cooling system connection. It is advantageous for a sealing device to be used as an interlay in order to ensure a pressure-tight joint and compensate for tolerances. Such a joint can, for example, be realized such that the openings of the cooling duct(s) are conical. The opening of the cooling system is also conical. An interlay, made of any elastic material and having corresponding conical projections, is placed between the openings. The cable duct is pressed against the part containing the cooling system connection, for example the engine block, in an appropriate manner. This can be affected, for example, with two lugs on the cable duct, which lugs are fixed in the engine block with bolts. A similar cooling duct connection can advantageously also be used to connect a cooling duct to a component which is to be cooled.

Figure 2C:
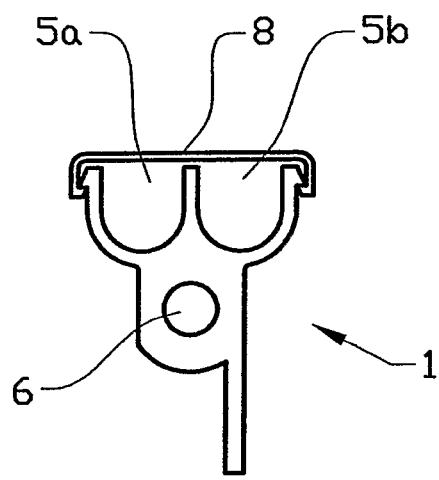

In a fourth preferred embodiment, the cable duct 1 can be provided with a cover 8 which covers the cabling according to FIG. 2c. This is advantageous where the cabling is to be run past extremely high temperatures or where radiation emanates from a plurality of heat sources. On the one hand, the cover 8 protects the cabling from direct heat radiation and, on the other hand, the cover conducts heat so that the cover acquires approximately the same temperature as the rest of the cable duct. This results in the cabling being enclosed in a body which has an even temperature all the way round. The cover 8 can correspond to the length of the cable duct or can merely cover a part of the cable duct, for example the part exposed to the highest heat radiation.

Figure 2D:
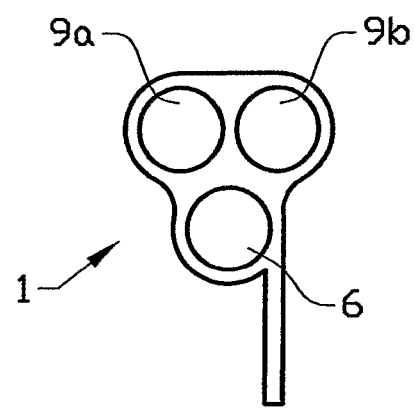

In a fifth preferred embodiment, the ducts for the cabling are also realized in the same way as a cooling duct; i.e., as one or more fully enclosed ducts 9a, 9b according to FIG. 2d. This can be advantageous in extreme temperatures and/or where the cable duct is exposed to high mechanical stresses, for example strong vibrations where there is a risk of wear. In this case, the cabling is drawn through the ducts 9a, 9b, either before or after the cable duct has been fitted in the vehicle. Since the cabling is generally prefabricated in cable trunks, it can be advantageous for the cable duct to form part of such a cable trunk.

A first illustrative embodiment of the method according to the invention for installing cabling in a hot environment on a vehicle incorporates the steps of fitting a cable duct according to the invention on, for example, the engine in the vehicle, connecting a cooling duct to the vehicle cooling system and installing the cabling in the cable duct according to the invention. This method allows the use of a conventional cabling; i.e., a cabling made of a conventional cable material such as, for example, PVC, even where the cabling is installed in an environment which would normally be too hot for the material contained in the cabling. By being able to use a conventional cabling even in a hot environment, both cabling costs and installation costs can be curbed since both standard cabling and standard connectors can be used.

The invention will not be deemed limited to the illustrative embodiments described above, but rather a number of further variants and modifications are conceivable within the scope of the patent claims. The cable duct can be used, for example, not only to conduct electric cabling, but also for other thin components in need of heat protection, for example optic fibers or air hoses.

What is claimed is:

1. A cable duct (1) for a motor vehicle, comprising: a plurality of metal longitudinal sections (2,3) comprising a first section (2) configured to support at least one cabling and at least one second section (3) connected to said first section (2) in heat-conducting relationship therewith and configured to be connected to an external cooling system, said at least one second section (3) including a pressure-tight conduit extending through it whereby a pressurized cooling medium pass through and be contained within the at least one second section (3), the cable duct (1) being sized and configured to be installed within the engine compartment of the motor vehicle.

2. The cable duct as recited in claim 1, wherein the first section (2) is divided into a plurality of subsections (5a, 5b) and each subsection is intended to support a cabling.

3. The cable duct as recited in claim 1, wherein the first section (2) comprises at least one fastening device for said cabling.

4. The cable duct as recited in claim 1, wherein an opening between outer walls (7a, 7b) in the first section (2) or between an outer wall (7a, 7b) and a partition wall (7c) in a subsection (5a, 5b) is less than the cross section of the cabling to be installed in the section or sub-section.

5. The cable duct as recited in claim 1, wherein the second section (3) is divided into a plurality of subsections (6a, 6b) in which at least one subsection (6a) is intended as a supply conduit and at least one subsection (6b) is intended as a return conduit for the cooling medium.

6. The cable duct as recited in claim 1, wherein the cable duct comprises at least one integrated fastening device (4) for fixing the cable duct (1) to another element.

7. The cable duct as recited in claim 1, wherein the cable duct comprises at least one integrated fastening device (4) for fixing a component to the cable duct (1).

8. The cable duct as recited in claim 1, wherein the cable duct (1) is configured as an extruded profile made of one of (1) an aluminum alloy and (2) a composite.

9. The cable duct as recited in claim 1, wherein the cable duct (1) is configured as a die-cast part made of one of (1) an aluminum alloy and (2) a composite.

10. The cable duct as recited in claim 1, wherein the first section (2) comprises a detachable element (8) forming a connection between outer walls (7a, 7b) of the first section.

11. The cable duct as recited in claim 1, wherein the first section (2) comprises at least one closed duct (9a, 9b).

12. The cable duct as recited in claim 1, wherein the first section (2) is divided into a plurality of subsections (5a, 5b) in which each of said subsections is configured to support a cable therein and wherein the first section (2) has at least one fastening device for said cable.

13. The cable duct as recited in claim 1, wherein the first section (2) has an open configuration to permit cabling to be supported by the cable duct to be pressed laterally into said first section (2) and secured therein.

* * * * *